United States Patent [19]

Miyao

[11] Patent Number: 4,586,176
[45] Date of Patent: Apr. 29, 1986

[54] METHOD FOR CORRECTION OF TROUBLE IN DIGITAL SIGNAL TRANSMISSION SYSTEM

[75] Inventor: Fumio Miyao, Ebina, Japan

[73] Assignee: Fuji Xerox Co., Ltd., Kanagawa, Japan

[21] Appl. No.: 609,786

[22] Filed: May 14, 1984

[30] Foreign Application Priority Data

Jun. 22, 1983 [JP] Japan ............................. 58-110968

[51] Int. Cl.⁴ .......................... H04J 3/02; H04J 3/00
[52] U.S. Cl. ..................................... 370/85; 370/86; 340/825.5
[58] Field of Search .................. 370/13, 16, 85, 86, 370/94; 340/825.5, 825.51

[56] References Cited

U.S. PATENT DOCUMENTS 4,063,220 12/1977 Metcalfe et al. ................... 340/147
4,502,137 2/1985 Tan ..................................... 370/85
4,525,832 6/1985 Miyao ................................. 370/85

FOREIGN PATENT DOCUMENTS 15495682 3/1981 Japan .
3871481 3/1981 Japan .
56-172897 10/1981 Japan .
5875349 10/1981 Japan .
17289581 10/1981 Japan .
7534883 10/1981 Japan .

Primary Examiner—Douglas W. Olms
Assistant Examiner—Wellington Chin
Attorney, Agent, or Firm—Kinney & Lange

[57] ABSTRACT

This invention provides a method for the correction of troubles in the digital signal transmission system, which enables system timing to be quickly established when there occurs collision of master packets for one cause or another.

According to this invention, further transmission of master packets from the master stations which brought about a collision of the master packets is discontinued when the collision is detected, and a station having the highest priority for qualification as next master station to transmit master packets among the stations (exclusive or inclusive of those having transmitted the aforementioned master packets of the collision) is caused to transmit master packets in the blocks of the number in which the former master stations have been transmitting the master packets.

7 Claims, 10 Drawing Figures

METHOD FOR CORRECTION OF TROUBLE IN DIGITAL SIGNAL TRANSMISSION SYSTEM

BACKGROUND OF THE INVENTION

1. Field of the Invention

This invention relates to a method for the correction of troubles in the digital signal transmission system, and more particularly to a method for the correction of troubles in the digital signal transmission system, which enables system timing to be quickly established when there occurs collision of master packets for one cause or another.

2. Description of the Prior Art

The dissemination of electronic computers and the growth of digital signal processing techniques have recently culminated in successful combination of communication systems with data processing systems and perfection of data communications devoted to on-line data processing. These achievements are attracting mounting public interest and respect.

Particularly in the small-scale communication systems, such as for the intraorganizational communication confined within the premises of a government or public office or of a private corporation, the system which effects communication in the form of packets by means of a transmission cable such as a coaxial cable is attracting particularly keen interest owing to its features such as good economy, high reliability, and prominent efficiency of transmission.

This communication system which makes use of packets requires installation, as in laboratories, of transmission cables adapted to effect transmission in both directions and connection to these transmission cables of numerous personal stations. From these personal stations, data (or messages) divided into data blocks each of 1000 to 2000 bits, for example, are transmitted through the transmission cables. The individual messages are each prefixed with a header covering such information as address and serial number.

In the communication system of this nature, the network itself is a passive transmission medium totally devoid of any control function and the individual personal stations have such control functions thoroughly distributed among themselves.

At a given personal station, therefore, transmission of a message is started when an idle channel is available in the cables. When a packet of data transmitted from one personal station collides with a packet of data transmitted from another personal station, these two personal stations discontinue the transmission of their data. The personal station which has discontinued the transmission, on elapse of a random queuing time, tries to resume the transmission of the data.

Incidentally in this communication system, since individual personal stations have liberty of starting data transmission at any time desired, there is a possibility of packets colliding with each other on the transmission line. The communication system, therefore, entails a problem in that it has no fixed transmission delay time. Because of this problem, it does not perfectly fit the real-time transmission such as for the conversation type vocal communication in which real-time transmission and reception are highly valued.

For the solution of the problem just mentioned, there has been proposed the modified Ethernet system which is capable of providing real-time transmission without depriving the personal stations of their mutual equality.

In accordance with this signal transmission system, the frames which are periodically repeated along time axis are each divided into a plurality of blocks along the time axis. With these blocks as the unit, this system provides the personal stations with chances for packet type communication.

In this signal transmission system, all the personal stations are equally entitled to the use of idle blocks. In the case where a given personal station occupies a specific block over the time necessary for signal transmission, that personal station is periodically given a chance for signal transmission in each of frames repeated on the time base. Thus, this system permits the personal stations to effect real-time transmission of signals by making use of the function described above.

Figure 1:
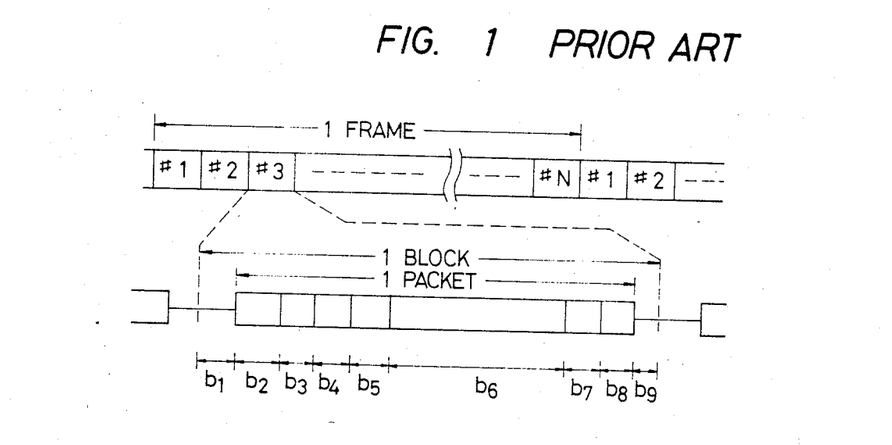
FIG. 1 is a diagram illustrating a typical set of transmission signals for use in a digital signal transmission system which divides each of the frames periodically repeated along time axis into a plurality of unit blocks and allows signals to be transmitted in such blocks along the time axis.

One typical frame configuration for the signals to be used in the aforementioned digital signal transmission system is illustrated in FIG. 1.

Each of the frames which are repeated periodically on the time base consists of N blocks (#1 through #N). And each of the blocks consists of various bit rows, $b_1$ through $b_9$, as shown below.

$b_1$ ... Rear guard time
$b_2$ ... Preamble
$b_3$ ... Address bit
$b_4$ ... Distance code bit
$b_5$ ... Control bit
$b_6$ ... Data bit
$b_7$ ... Check bit
$b_8$ ... End flag
$b_9$ ... Front guard time The bit rows $b_2$ through $b_5$ and the bit rows $b_7$ and $b_8$ are essential components for a packet. These bit rows are collectively referred to as "overhead bits." The two bit rows, $b_1$ and $b_9$, are collectively referred to as the "guard time."

The term "guard time" means "empty bit rows" which are intended to preclude the situation in which packets in adjacent blocks may possibly be caused to overlap, if partially, owing to the delay time which occurs during the propagation of signals on a coaxial cable.

In the bit rows forming this guard time, the backward guard time $b_1$ serves to protect the trailing one of any two adjacent packets against the trouble of overlapping and the forward guard time $b_9$ similarly to protect the leading packet against the trouble.

The sum of the number of bits of the rear guard time $b_1$, and that of bits of the front guard time $b_9$, will be represented as g bits and the guard time ($b_1 + b_9$) will be represented hereinafter as $T_g$.

In the digital signal transmission system proposed as described above, when none of the personal stations in the system is transmitting signal, all the personal stations have a chance, equally and at any time at all, to start sending out signals in the aformentioned frame configuration. Thus, the particular personal station which is the first to start sending out signals onto the transmission cable will take the initiative in the synchronization of frames.

Once the frame synchronization has been established as described above, all the personal stations are enabled to keep-watch on the state of signals being transmitted on the transmission cable.

As will be described fully afterward, the user devices at the personal stations are each provided with a memory adapted to memorize the condition of occupation of individual blocks by signals in the frames. Thus, all the personal stations are allowed to register relevant blocks based on the incoming packet signals addressed to themselves.

After the particular personal station has established the frame synchronization, any of the other personal stations is allowed to send out packet signals by selecting empty blocks based on the information stored in the aforementioned memory and loading these empty blocks with packet signals desired to be transmitted.

In this case, the timing by which the personal stations are allowed to send out their own packet signals poses a problem.

Figure 2:
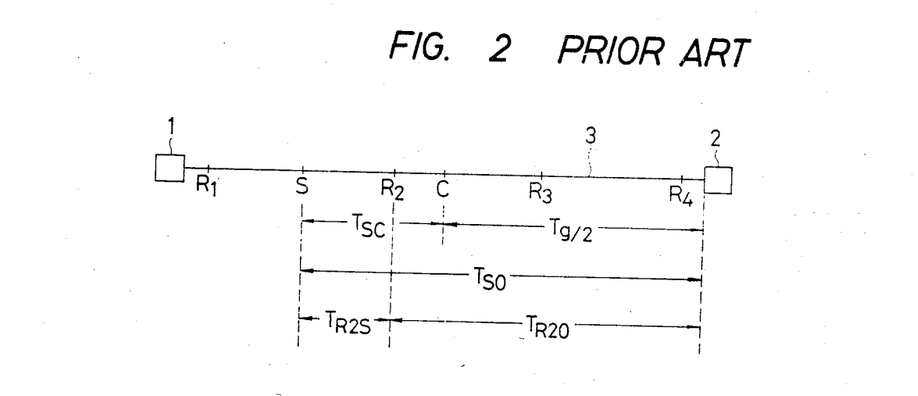
FIG. 2 is an explanatory layout diagram illustrating the manner of distribution of the personal stations on a coaxial cable.

For the sake of explanation, let us assume that, as illustrated in FIG. 2, a coaxial cable 3 has its opposite ends connected to impedance matching terminators 1, 2, a personal station C is located at the middle point of the coaxial cable 3, and a personal station S located between the personal station C and the terminal 1 is already in the process of transmitting signals on the coaxial cable 3.

In this case, the packet signals which are being sent out by the personal station S are received by the personal station C and the other personal stations, $R_1$ through $R_4$, on the coaxial cable 3 at different points of time, depending on the variation in the signal propagation delay time on the cable 3.

If the personal stations randomly send out their own signals without regard to the other personal stations, then there is a fair possibility that the packets issuing from such personal stations will overlap (collide with) each other on the coaxial cable 3.

For the purpose of precluding this problem, the aforementioned signal transmission system makes effective use of the aforementioned concept of guard time $T_g$, in establishing the synchronization of system timing.

To be more specific, in this signal transmission system, the guard time $T_g$, is fixed at two or more times the signal propagation delay time required to cover the distance between the centrally located personal station C, datum position, and the most distant personal station and the transmission of signals is effected so that, at the receiving point of the centrally located personal station C, the packets issuing from the individual personal stations will be arranged as separated by equal intervals.

Figure 3:
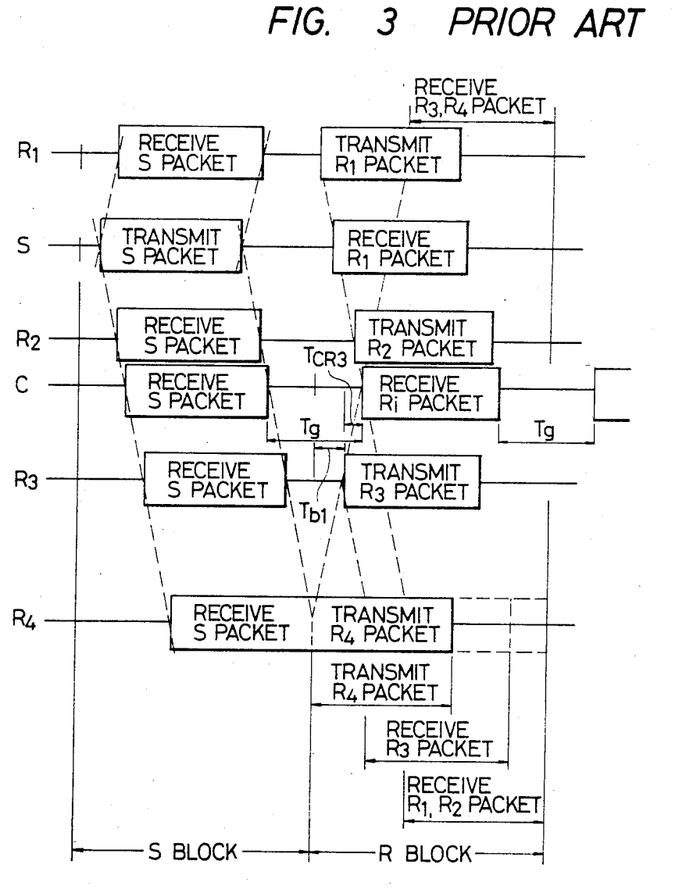
FIG. 3 is a timing diagram illustrating the envelope of signal waveform of transmission and reception packets at the point of reception (tap) of each of the personal stations illustrated in FIG. 2.

FIG. 3 provides more specific illustration of the working of the signal transmission system. The diagram depicts the system based on the assumption that while the personal stations of the system are connected as illustrated in FIG. 2, the personal station S is already in the process of transmitting signals and the other personal stations, $R_1$ through $R_4$, are about to start sending out packet signals.

In this case, the personal stations $R_1$ through $R_4$ which follow the personal stations S in the order of signal transmission determine their own points of timing for sending out their own transmission packets so that the personal station C, the datum point, will begin to receive the transmitted packets one guard time $T_g$, after the personal station C completes reception of the transmission packets (or transmission S packets) from the personal station S.

To determine such timing for the issuance of signals, the personal stations $R_1$ through $R_4$, on receiving the packet signals transmitted on the coaxial cable 3, first examine the address bits ($b_3$) of the received packet signals and discern the reception of packets from the personal station S (reception S packets).

Further, the personal stations $R_1$ through $R_4$, based on the signal propagation delay times between the personal station S, the centrally located personal station C, and their own stations, determine the points of time at which the arrival of reception S packets at the point of reception of the personal station C is completed.

These points of time, as illustrated in FIG. 3, are later than the points of time at which the reception of the reception S packets at the personal stations $R_1$ and $R_2$ is completed and earlier than the point of time at which the reception of the reception S packets at the personal stations $R_3$ and $R_4$ is completed.

After the personal stations $R_1$ through $R_4$ have determined the point of time at which the reception of reception S packets is completed with reference to the personal station C as the datum point, the particular one of these four personal stations which desired to send out signals begins to send out packet signals [or transmission $R_i$ packets (i=1 to 4)] at the point of time which is earlier than the determined point of time mentioned above by an interval equivalent to the signal propagation delay time required to cover the distance between its own station and the personal station C.

The packet signals which have been sent out as described above begin to be received (as reception $R_i$ packets) at the personal station C as the datum point after elapse of one guard time $T_g$, from the time of completion of the reception of reception S packets as illustrated in FIG. 3.

This adjustment of the timing for sending out signals is accomplished by establishing frame synchronization and block synchronization at all the personal stations concerned.

Specifically, the personal stations are adapted, as described fully afterward, to reset periodically (at a fixed timing) the frame counter and the block counter which take count of the clock signals fed out by their own oscillators. Because of this function, the personal stations are able to establish frame synchronization and block synchronization within the tolerance of frequency of the clock signals.

In a system constructed as illustrated in FIG. 2 and FIG. 3, for example, while the personal station S is transmitting S packets by using the first block #1, the personal stations $R_1$ through $R_4$ control the aforementioned counters and establish the frame and block synchronizations so that the second block #2, for example, will be started after elapse of the time $T_{b9}$, according to the formula (1):

$$T_{b9} = T_g/2 + |T_g/2 - T_{SO}| - |T_{SO} - T_{RiO}| \qquad (1)$$

Wherein i=1 to 4
from the point of time at which the reception of reception S packets is completed. The time $T_{b9}$ is hereinafter referred to as "front guard time".

In the aforementioned formula (1), $T_{SO}$ denotes the signal propagation delay time required to cover the distance between the reference end of the coaxial cable 3 (such as, for example, the terminal 2 in the diagram of FIG. 2) and the personal station S and $T_{RiO}$ denotes the signal propagation time required to cover the distance between the aforementioned end to the personal station $R_i$ (i=1 to 4).

The second term of the right member of the formula (1), $|T_g/2 - T_{SO}|$, denotes the signal propagation delay time required to cover the distance between the personal station C and the personal station S and the third term, $|T_{SO}-T_{Rio}|$, denotes the signal propagation delay time required to cover the distance between the personal station S and the personal station $R_i$.

As described above, in the digital signal transmission system, the front guard time $T_{b9}$, namely the interval between the time that the reception of packets sent out by the master station which takes the initiative in the frame synchronization (personal station S in the preceding illustration) (hereinafter referred to as "master packets") is completed and the time that the next block timing is started, is determined by each of the personal stations in accordance with the pertinent one of the aforementioned formulas, using the relationship of position (or distance) with reference to the other personal station and the results are stored in the form of a conversion table in the memory device such as ROM (read only memory), for example.

This memory device is adapted so that when the code designating the transmitter of the master packet is injected into the memory device through the address designation terminal thereof, the memory device will feed out of its output terminal the signal corresponding to the front guard time $T_{b9}$.

Evidently, conversion tables containing data on front guard time for individual personal stations obtainable in accordance with the aforementioned formula (1) have their contents varied from one personal station to another. They have a further disadvantage that their contents of memory expand rapidly as the number of personal stations increases.

As the result, design or production of a memory device such as ROM which is used for memorizing these conversion tables calls for time and labor so great as to impede the realization of a communication system utilizing this method.

As a solution of this problem, there has been proposed a method which comprises causing distance codes which exclusively depend on signal propagation delay times between personal station on the transmission cable to be included in advance in the address codes of packets to be sent out by personal stations and allowing the signal propagation delay time between two given personal stations to be calculated on the basis of the distance codes and the address codes.

In this method, the distance codes are transmitted as included in both the address number of the receiving personal station to which the packets are addressed and the address number of the transmitting personal station. At the receiving personal station, the calculation of the pertinent one of the aforementioned formula (1) is performed on the basis of the two sets of distance codes.

In this case, since each of the personal stations is required to memorize distance codes of all the other personal stations against their corresponding address numbers, it must be provided with a memory device such as a ROM (read only memory) or RAM (random access memory), for example.

The provision of such memory devices for all the personal stations evidently entails a great addition to the cost of equipment. Moreover, when ROM's are adopted, a change in the location of any personal station necessitates replacement of the ROM's used at all the personal stations. This fact divests the system using ROM's of its economic feasibility.

When RAM's are adopted, a change made in the location of any personal station necessitates that particular personal station to cause the contents of the RAM's at all the other personal stations to be renewed wholly by the use of the transmission cable.

Further, the system must be provided with a proper backup power source (batteries) adapted to prevent the contents of such memory devices from being erased during a failure of the commercial power line.

There has also been proposed a method which enables system timing to be established by giving the distance code of a transmitting station in advance only to the address code of the master packet thereby enabling the individual personal stations to calculate timing for packet transmission on the basis of such data and to materialize the establishment of the system timing (as disclosed, for example, by U.S. patent appln. Ser. No. 509,215 filed on June 20, 1983 by the applicant of this invention).

In this case, the particular packet carrying the data which the station just changed to a master station elects to transmit turns into a master packet.

When the data to be transmitted by the master station have run out, the master station must transfer the role of master station to some other station which happens to be engaging in communication at that moment.

For the purpose of ensuring this transfer of the status of master station and in consideration of measures called for in case of trouble, the procedure involved in the transfer turns out to be quite complicated.

As means for avoiding this complexity, there has been proposed a method which has one specific station designated as a stationary master station by having one specific block constantly allocated to that specific station and causes this stationary master station to sent out master packets at all times in that block, keep watch of the entire system, and serve as a central station for maintenance (Japanese patent application No. 38714/81).

This method, however, necessitates one specific station to serve as a stationary master station and another stationary master station to serve as a standby required in case of trouble.

As one possible remedy for this situation, there may be conceived a method which enables all the personal stations connected to the transmission line to function on an equal status and causes one of these personal stations to be converted into a constant master station under a certain condition.

Figure 4:
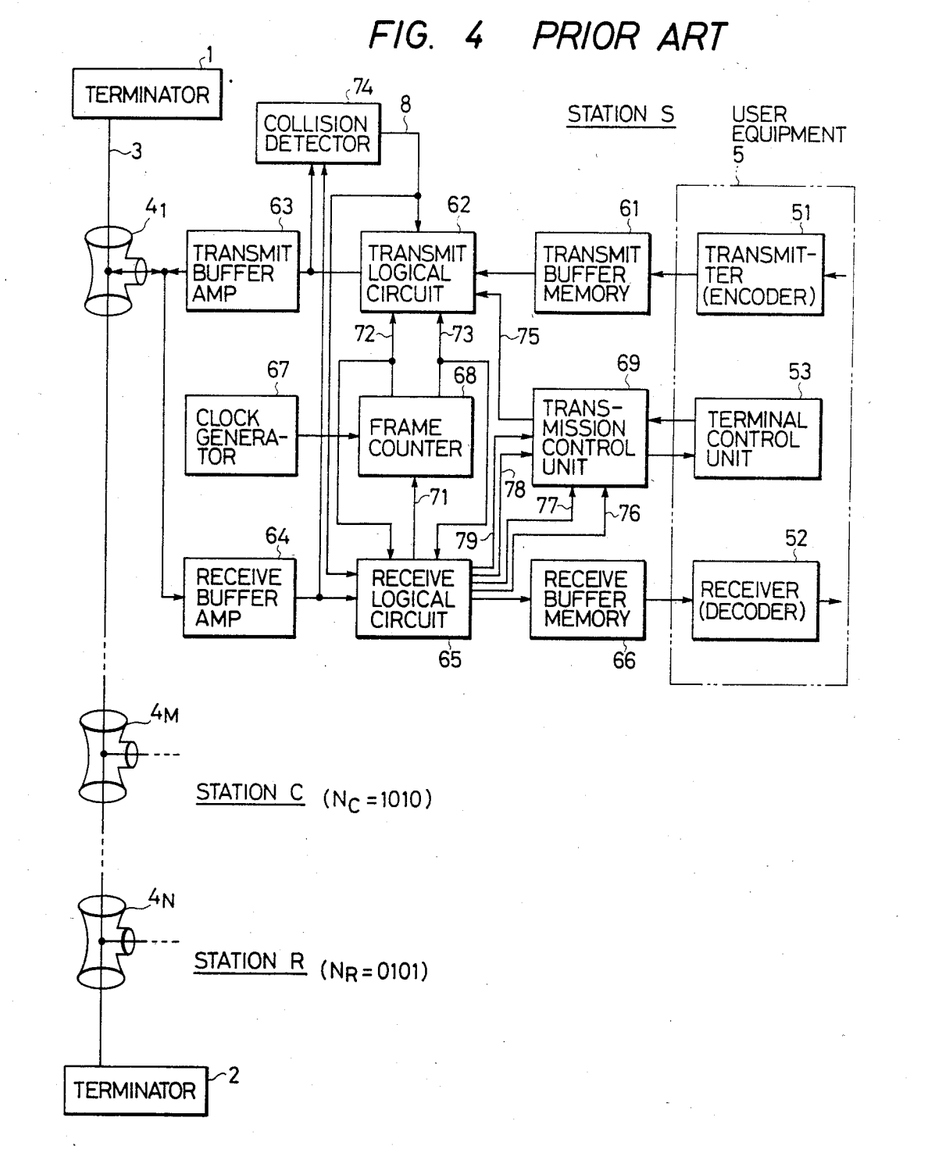
FIG. 4 is a block diagram illustrating in outline a communication system suitable for embodying the present invention.

FIG. 4 represents in outline a communication system for materializing a typical digital signal transmission system as described above.

In this communication system, a coaxial cable 3 laid as a channel has its opposite ends connected to impedance-matching terminators 1, 2 having electrical resistance equal in magnitude to characteristic impedance of the said cable.

The personal stations are connected through the respective T connectors (taps), $4_1$–$4_N$, to the coaxial cable 3. All these personal stations have a basically identical structure. To avoid wasteful repetition, therefore, the essential components of the personal station, S, connected through the T connector $4_1$ are illustrated representatively in the diagram.

Each of the personal stations is provided with user equipment 5 incorporating a computer and a telephone.

The user equipment 5 is further provided with a transmitter (encoder) 51 for transmitting digital signals of the unit of packets to some other personal station, a receiver (decoder) 52 for receiving digital signals of the unit of packets transmitted by some other personal station, and a terminal control unit 53 for controlling terminals.

The signals issued from the transmitter 51 are temporarily stored in a transmission buffer memory 61. The stored outgoing signals are then read out of the buffer memory 61 at a prescribed time by clock signals equalling the transmission speed on the coaxial cable 3 serving as a transmission medium. The signals thus read out are converted into packets of a prescribed pattern by a transmit logical circuit 62. These packets are sent through a transmit buffer amplifier 63 and forwarded via the T connector $4_1$ onto the coaxial cable 3.

All the packet signals which are being transmitted on the coaxial cable 3 are sent through the T connector $4_1$, received by a reception buffer amplifier 64, and supplied to a receive logical circuit 65.

The receive logical circuit 65 selects, out of all the incoming packets, only the packets addressed to its own personal station and puts the selected packets to temporary storage in a receive buffer memory 66. The packet signals thus kept in storage are read out continuously by the use of a prescribed clock in the receiver 52. Thus are obtained received output signals.

The transmission and reception of signals are accomplished as described above. The transmission clock which is used in this case is generated by a transmit clock oscillator 67. A frame counter 68 serves to divide this transmit clock to produce a block timing signal 72 and a frame timing signal 73.

A transmission control unit 69 effects control of the terminal control unit 53 in accordance with reception signals addressed to its own personal station and derived from the receive logical circuit 65 and, at the same time, controls the transmit logical circuit 62 in accordance with instructions from the terminal control device 53.

A collision detector 74 serves, at the time that the first packet signal is issued on the block selected by its own personal station, to check and confirm whether or not that packet signal has collided with a packet signal issued from some other personal station.

In the method for the synchronization of system timing for the digital signal transmission system as described above as the distance codes for the personal stations S, C, and R, those codes which are exclusively related to the respective durations of signal propagation delay time on the coxial cable 3 are used.

For example, the duration of signal propagation delay time proportionate to the distances from the terminator 2 disposed at the lower end in the diagram of FIG. 4 taken as the datum point to the respective taps $4_1$ through $4_N$ on the upwardly extending coaxial cable 3 are used as distance codes.

Evidently in this arrangement, the lengths of signal propagation delay time between the personal stations are represented by the respective differences between the distance codes of such personal stations. More practically, one bit of the digital signals being transmitted on the coaxial cable 3 may possibly be used as the unit for the distance codes.

For the sake of illustration, let us assume that the distance from the terminator 2 to the tap $4_N$ of the personal station R which verges on occupying the second block #2 to be 100 m (meters) and the distance from the terminator 2 to the tap $4_M$ of the reference station C is 200 m.

It is further assumed that the signal propagation delay time on the coaxial cable 3 is 5 nS (nanoseconds) per meter and the speed of digital signal transmission is 10 Mbps (megabit/second). In this case, therefore, the width of one bit is 100 nS. Thus, the distances 100 m and 200 m correspond to 5-bit width and 10-bit width respectively.

On the assumption that the distances between the personal stations R and C and their respective taps $4_N$ and $4_M$ can be ignored, the distance codes $N_R$ and $N_C$ at the personal station R and C may be represented by the following numbers of bits.

$N_R = 5$ (bits)
$N_C = 10$ (bits)

By the binary code notation, they are represented as follows.

$N_R = 0101$
$N_C = 1010$

When the guard time $T_g$, and the distance code $N_S$, of the master station S which occupies the first block #1, are similarly represented by bits, the arithmetic operations of the aforementioned formula (1) amounts to simple binary operations.

The receive logic circuit 65 is provided with an arithmetic circuit and a programmable timer for computing the front guard time $T_{b9}$. It feeds out the reset signal 71 after elapse of the front guard time $T_{b9}$, from the time at which the reception of reception master S packets is completed.

The reset signal 71, on arrival at the frame counter 68, resets this counter. Consequently, the block timing 72 and the frame timing 73 supplied to the transmit logic circuit 62 are synchronized.

The manner in which the synchronization of system timing is actually attained in a communication system configurated as illustrated in FIG. 4 will be described below.

When a personal station is requested to start data transmission, this personal station can determine whether it should turn itself into a master station by checking the existent condition of registration of a block control memory inside a transmission control unit 69 thereby finding whether or not transmission of packet signals is proceeding on the coaxial cable 3.

This personal station, on confirming that none of the personal stations is transmitting any signal packet, effects new transmission of a master packet and, on succeeding in effecting this new transmission, turns itself into a master station.

The master packet is any other packet which occupies a block with a specific number such as, for example, #1 block, and carries therein the data required by each personal station for establishing its own system timing and the packet for carrying the data indicating which personal station being about to effect data transmission elects to transmit (hereinafter referred to as "data packet").

In this case, if some other personal station happens to transmit a master packet at the same time by following the same procedure, there is a possibility that the two master packets will collide with each other. When this collision happens, the situation may be corrected by adopting any of several retransmission control methods heretofore proposed such as, for example, the BEB (Binary Exponential Backoff) protocol.

The personal station which succeeds in sending out the master packet as described above starts transmitting data packets containing the data desired to be transmitted, from the next frame. When the data to be transmitted from this master station run out, although the transmission of data packets is terminated, the transmission of master packets is still continued thereafter.

Any other personal station (slave station) than the master station checks all the incoming packets and finds out whether they are master packets or not.

The identification of a master packet may be effected by using a certain specific address code or by following the practice of filling the slot (bit train) $b_4$ in the packet structure described above, only in the case of a master packet, with the distance code of the master station and, in the case of any other station, invariably with "0" or "1", for example.

Otherwise, the discrimination of a master packet from other data packet may be effected by allocating in advance to the slot $b_5$ (control bit) a special bit serving to designate a master packet and finding out the status of the bit held in the slot at the time of discrimination. By combining these methods, the discrimination of a master packet can be accomplished with increased certainty.

If a method is adopted which is not required to rely for discrimination of a master packet on the distance code in the slot $b_4$, the slot $b_4$ in the data packet may be used for some other purpose.

When a given packet is identified to be a master packet, the distance code in the slot $b_4$ is transferred to the system timing arithmetic circuit located within a receive logical circuit 65 illustrated in FIG. 4 to carry out the aforementioned operation for the establishment of system timing.

Figure 5A:
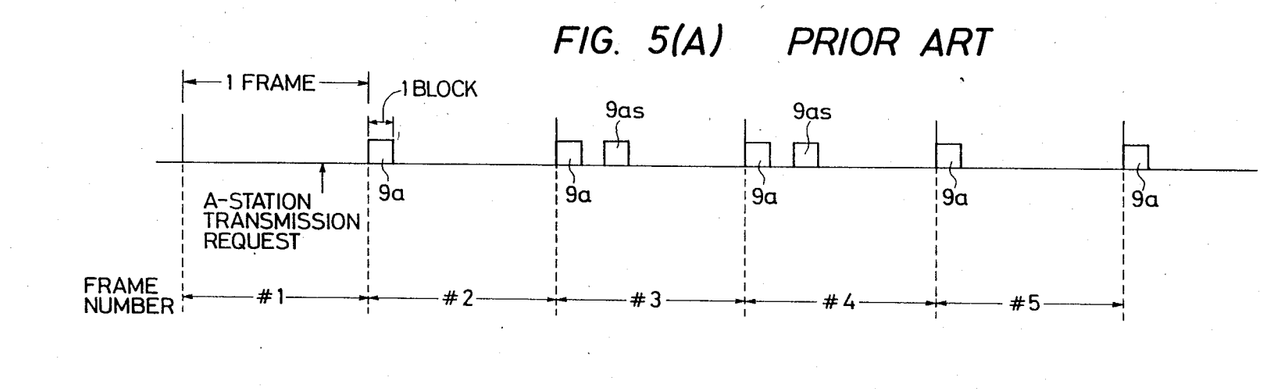
FIG. 5(A) is a timing diagram illustrating the manner of transmission of packets from the personal stations in a prior art system timing design.
Figure 5B:
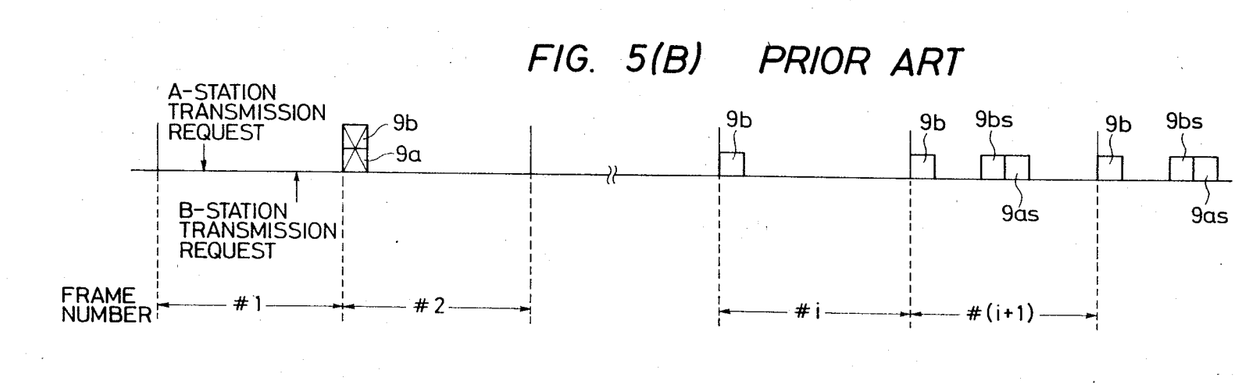
FIG. 5(B) is a timing diagram illustrating the procedure for establishing system timing by the conventional method based on occurrence of collision of master packets.

FIG. 5 represents a timing diagram for illustrating the condition of master packet transmission as described above.

Part (A) of FIG. 5 represents a timing diagram illustrating a case wherein Station A issues a transmission request in the first frame while the transmission line is empty as in the first frame and subsequently succeeds in transmitting a master packet 9a in the first block of the next first frame, i.e., the second frame (without involving any collision of master packets).

In each of the third and subsequent frames, Station A sends out a master packet 9a in the first block and a data packet 9as in some other proper block.

Part (B) of FIG. 5 represents a timing diagram illustrating a case wherein Station A and Station B severally issue transmission requests in the first frame while the transmission line is empty as in the first frame and, as the result, the respective master packets 9a, 9b collide with each other in the next first frame, i.e., the second frame.

When such collision of master packets as described above takes place, Station A and Station B which have sent out these master packets severally repeat the transmission of master packets after preset intervals of their own. In the illustrated case, Station B succeeds in transmitting a master packet 9b in the first block of an i'th frame.

Thereafter, in each of the (i+1)'th and subsequent frames, Station B transmits the master packet 9b in the first block and the data packets 9as, 9bs respectively of Station A and Station B are transmitted in the other blocks.

In either of the cases illustrated in Part (A) and Part (B) of FIG. 5, the master station continues to transmit only master packets even after the data of its own to be transmitted have run out.

It is not impossible that while the master station is continuing to transmit only master packets, the continued transmission of master packets will be impeded as when the power supply to the master station is broken or the master station itself develops trouble.

In this case, if no signal is present in the transmission line, then there ensues no special trouble because the particular personal station beginning to start data transmission next converts itself into a master station by following the procedure described above.

If some signals happen to be present on the transmission line, then the individual personal stations are caused by their own oscillators to assume the state of free run. As the result, the system timings of the personal stations are gradually deviated eventually to a point where the system wil no longer provide required communication.

To prevent this mishap, the individual personal stations or the particular station having the highest priority for qualification as next master station keeps watch constantly on the presence of master packets. When not a single master packet is detected in any one frame, the trouble which would otherwise ensue can be precluded by causing the personal station having the highest priority for qualification as next master station (such as, for example, the personal station using the block of the smallest possible number) to transmit a master packet in the block of the particular number in which the immediately preceding master station has been transmitting master packets.

By this arrangement, the necessity for performing the complicated procedure of transfer of master packets for each communication unit can be obviated and the configuration of system can be simplified.

Figure 7:
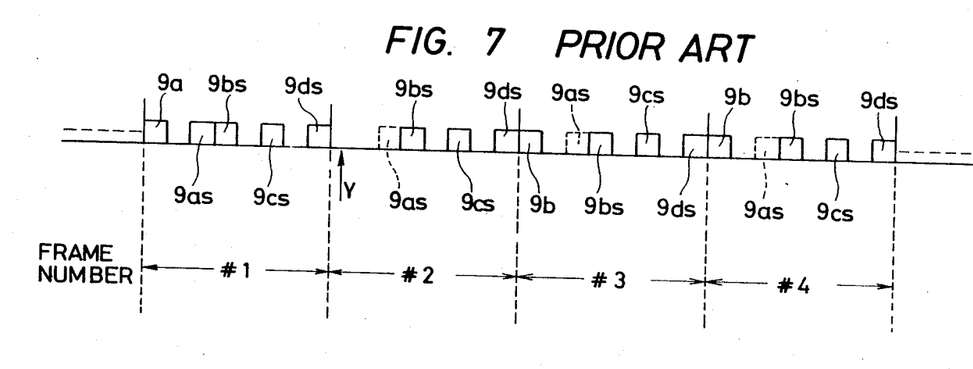
FIG. 7 is a timing diagram illustrating the procedure for establishing system timing by the conventional method based on disappearance of master packets.

FIG. 7 represents a timing diagram illustrating a case wherein master packets have disappeared.

This diagram portrays a situation wherein the master packets 9a sent out from Station A have disappeared at #1 block indicated by the arrow Y in the second frame and, in consequence of this disappearance of master packet, Station B which happens to be using the block of the smallest possible number in the third frame takes over the function of master station and sends out master packets 9b of its own in the 190 1 block in which Station A has been transmitting its own master packets.

In this case, it is possible that trouble develops exclusively in the portion of Station A serving to transmit master packets and the data packets 9 as from Station A are normally transmitted even in the second and subsequent frames as indicated by a dotted line. In this case, the personal stations other than Station A are allowed to memorize the block being used by Station A in the block control memory within the transmission control unit 69 illustrated in FIG. 4 and the particular station, other than Station A, which happens to be using the block of the smallest possible number (Station B in the case of FIG. 7) sends out master packets in the next frame.

When this method is adopted, however, there is a possibility that collision of the master packets under transmission will occur owing to some trouble or other.

If the procedure of retransmission control previously described is adopted to correct the trouble possibly ensuing from this collision of the master packets, there may arise a situation in which not a single master packet is present in several frames to some tens of frames in a row. As the result, the system timings are gradually deviated, as described above, even to a point where the system will fail to provide normal data transmission.

SUMMARY OF THE INVENTION

This invention has been perfected with a view to eliminating the various drawbacks described above. An object of this invention is to provide a method for the correction of troubles in the digital signal transmission system, which, on occurrence of collision of master packets, prevents the absence of master packets from persisting and disturbing the system timing and consequently spoiling the operation of communication.

To accomplish the object described above, this invention provides a method which comprises detecting collision of master packets transmitted from master stations and, in response to the detection, discontinuing further transmission of master packets from the master stations which have transmitted the master packets that brought about the aforementioned collision, and causing the stations, exclusive of those having transmitted the aforementioned master packets of the collision, with the highest priority for qualification as next master stations to transmit master packets (in the blocks of the number in which the former master stations have been transmitting master packets).

The present invention also provides a method which comprises detecting collision of master packets transmitted from master stations and, in response to the detection, discontinuing further transmission of master packets from the master stations which transmitted the master packets that brought about the aforementioned collision and, at the same time, causing all the stations, inclusive of those having transmitted the aforementioned master packets causing the collision, to determine whether they have the highest priority for qualification as next master stations, and causing the stations with the highest priority for qualification to act as the next master stations to transmit master packets (in the blocks of the number in which the former master stations have been transmitting master packets).

The present invention further provides a method which comprises detecting collision of master packets transmitted from master stations and, in response to the detection, discontinuing further transmission of master packets from the master stations which have transmitted the master packets that brought about the aforementioned collision and, at the same time, causing all the stations, exclusive of those which transmitted master packets before the aforementioned collision, to determine whether they have the highest priority for qualification as next master stations, and causing the stations with the highest priority for qualification to act as the next master station to transmit master packets (in the blocks of the number in which the former master stations have been transmitting master packets).

DETAILED DESCRIPTION OF THE PREFERRED EMBODIMENTS

Now, the present invention will be described in detail herein below with reference to the accompanying drawings.

Figure 8:
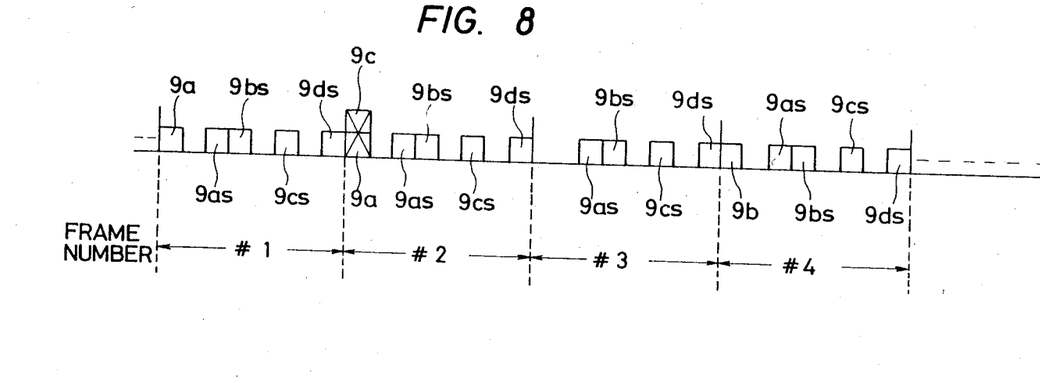
FIG. 8 and FIG. 9 are each a timing diagram illustrating the procedure for establishing system timing in one embodiment of the present invention.

FIG. 8 is a timing diagram for illustrating the operation of one embodiment of this invention. In this diagram, the symbols identical to those found in FIG. 5 and FIG. 7 stand for identical or equivalent parts.

EXAMPLE 1

FIG. 8 depicts a particular timing which exists when collision of master packets takes place during the course of transmission.

In the first frame illustrated in the diagram, Station A is serving as a master station and is transmitting master packets 9a in the #1 block.

Because of occurrence of some trouble or other in the second frame, Station C has issued master packets 9c in the #1 block. Consequently, there has ensued collision between the master packets 9a, 9c.

At this point, all the stations become cognizant of the occurrence of collision of the master packets. When collision occurs on the master packet which has already been transmitted as described above, the station which has been transmitting master packets (Station A in the present case) and the station which has just started transmitting master packets and consequently caused the collision (Station C in the present case) discontinue their transmission of master packets at the time that the collision is detected.

To be specific, in the third frame of the diagram illustrated in FIG. 8, the master packets transmitted in the #1 block before the collision have disappeared because Station A and Station C which have transmitted master packets 9a, 9c in the second frame discontinue transmission of master packets from their own stations.

The other stations or the stations having the highest priority for qualification as next master stations are keeping watch on the disappearance of master packets in the master packet block and on the collision of such master packets. When such collision of master packets as described above is detected, they confirm the disappearance of master packets in the next frame (#3 frame in the case illustrated in FIG. 8).

In the fourth frame, the station using the block of the smallest number of all the stations except for Station A and Station C (generally, the station having the highest priority for qualification as a next master station)—Station B in the illustrated case—takes over the function of a master station and begins to transmit master packets 9b of its own in the same #1 block as before. Consequently, there is established system timing.

Figure 6:
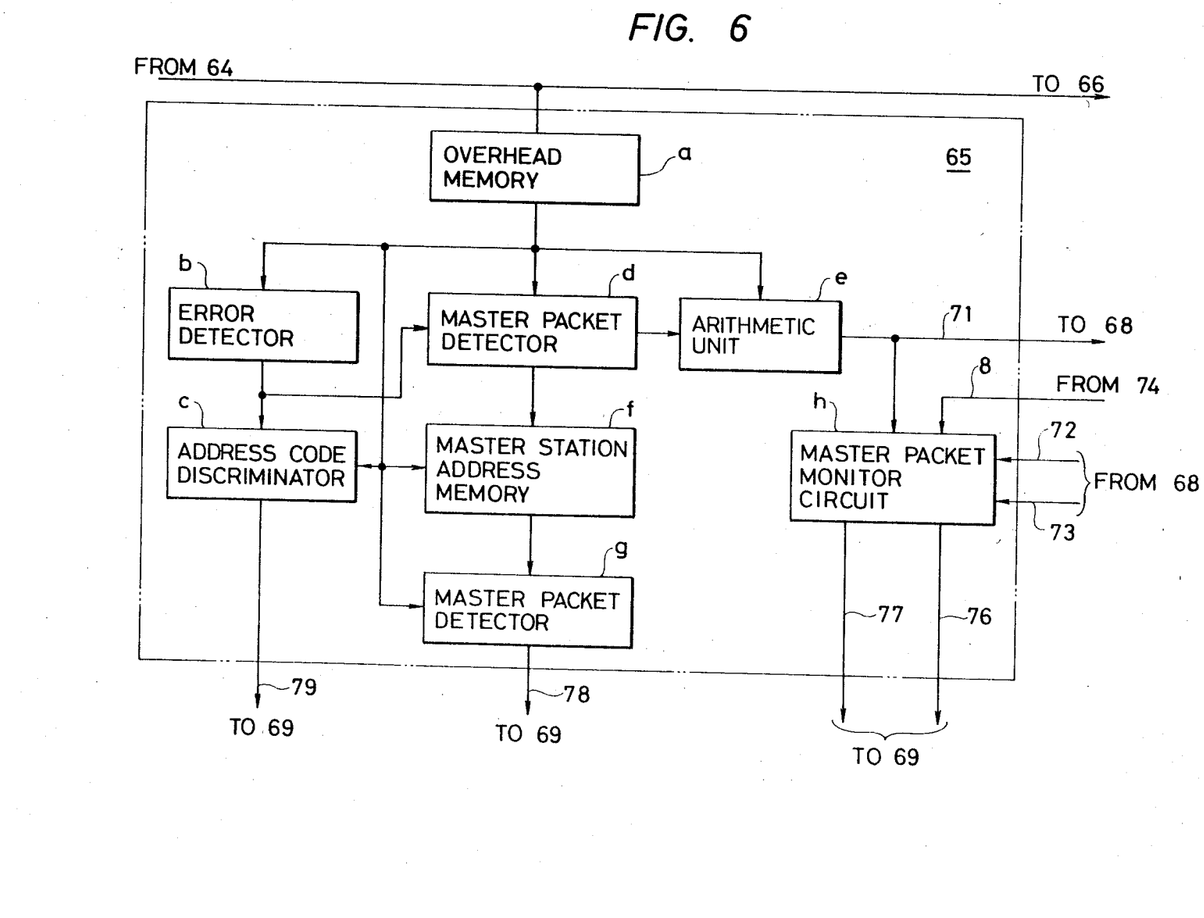
FIG. 6 is a detailed block diagram of the receive logic circuit of FIG. 4 in one embodiment of the present invention.

FIG. 6 is a detailed block diagram of the portion of the receive logic circuit 65 of FIG. 4 which has direct bearing upon the present embodiment.

In this diagram, a denotes an overhead memory serving to extract and memorize the overhead bit from the output of the receive buffer amplifier 64, b denotes an error detector serving to check the reception data for possible code error, and c denotes an address code discriminator serving to check the address code selectively in the address bits of the overhead bits and confirm that this code is addressed to the receiving personal station.

Further, d denotes a master packet detector serving to check the received packet and determine whether or not it is a master packet and e denotes an arithmetic circuit for computing the guard time of the formula (1) in accordance with the distance code of the received data and that of the personal station's own distance code, and for consequently generating the reset signal 71.

Then, f denotes a master station address memory for storing the address of the master station drawn from the master packet and g denotes a master station packet detection circuit which compares the address of the master station stored in the master station address memory 5 with the address of the station transmitting the received packet and detects the block being used by the master station.

h denotes a master packet watch circuit which determines whether or not master packets are present in one frame.

When the receive buffer amplifier 64 is in operation and issues a reception packet, the overhead bits in this packet are stored in the overhead memory a. The overhead bits thus stored in the memory are transferred successively to the error detector b, the address code discriminator c, the master packet detector d, the arithmetic circuit e, the master station address memory f, and the master packet detector g.

The error detector b checks the received overhead bits and determines whether or not any code error has occurred in the bits (as by the technique of parity check) and gives the outcome of the check to the address code discriminator c and the master packet detector d. The address code discriminator c serves to check the address code selectively in the address bits $b_4$ to determine whether or not this address code agrees with that of the personal station's own and then forwards the outcome of the check to the transmission control circuit 69. The master packet detector d serves to check the received packet and confirm whether or not the received packet is a master packet and gives the outcome of the check to the arithmetic circuit e.

When the received overhead bits contain no code error and the received packet is identified as a master packet, the arithmetic circuit determines the front guard time $T_{b9}$ by the computation of the aforementioned formula (1) and generates the reset signal 71 after elapse of the aforementioned time $T_{b9}$ from the time of completion of the reception packet. As already pointed out, it is desirable that the computation of the front guard time is performed in the arithmetic circuit e before this circuit e receives the output of the master packet detector.

Further, the master station address memory f memorizes the transmitter's address in the master packet. After the address of the master station is memorized, the master station packet detecting circuit g compares the transmitter's address in the packet successively received with the master station address memorized therein.

Then, it detects the block being used by the master station and transfers the master station packet signal 78 consequently detected to the block control memory within the transfer control unit 69.

Consequently, the station other than the master station is enabled to determine whether it is using the block of the smallest number or not.

The master packet watch circuit h keeps watch to determine:
(1) Whether or not master packet has disappeared from the block position at which there has existed master packet, and
(2) whether or not a collision of master packets has occurred.

The results thus obtained are given as a master packet disappearance detection signal 76 and a master packet collision detection signal 77 to the transmission control unit 69.

At the transmission control unit 69, the following operations are performed upon detection of either of these signals.
(I) When the master packet disappearance detection signal 76 is received:
(A) If the pertinent station happens to be a master station (the station which has transmitted master packets), the master packet transmission command signal 75 being forwarded to the transmit logical circuit 62 is turned off to ensure discontinuation of the transmission of master packets from the next frame.
(B) If the pertinent stations happens to be a slave station and not a master station, the block control memory is checked to determine whether or not the pertinent station is using the block of the smallest number other than the master station.

When the use of the block of the smallest number is confirmed, the master packet transmission command signal 75 given to the transmit logical circuit 62 is turned on.

The transmit logical circuit 62 begins to transmit master packets from the #1 block of the next frame.

If the pertinent station is not using the block of the smallest number, the status existing at that time is maintained.
(II) When the master packet collision detection signal 77 is received;
(A) If the pertinent station happens to be a master station, the master packet transmission command signal 75 being delivered to the transmit logical circuit 62 is turned off to stop the transmission of master packet from the next frame.
(B) If the pertinent station happens to be other than a master station, after reception of the master packet collision detection signal 77, the reception of the master packet disappearance detection signal 76 in the next frame is awaited. Then, the aforementioned procedure for the treatment to be given on disappearance of master packets is started.

Further, in the aforementioned case, if the pertinent station is a slave station and absence of master packets occurs in two frames in a row despite the presence of a slave station using a block of a smaller number than the block being used by the station in question, the pertinent station is checked to determine whether or not it is using a block of the second smallest number. If the pertinent station gives an affirmative answer to this question, then it causes transmission of master packets from the next frame and carries out a step for taking over the status of master station.

In the preceding example, when there occurs collision of master packets, the particular stations which have transmitted the master packets discontinue the transmission of master packets in the next frame and the station having the highest priority of all the stations, exclusive of the stations which have transmitted the master packets relating to the collision, for qualification as a next master station (specifically, the station using the block of the smallest number, for example) takes over the function of master station. Otherwise, this invention may be embodied as illustrated in Example 2 and Example 3.

EXAMPLE 2

When collision of master packets takes place, the stations which have transmitted these master packets stop further transmission of master packets in the next frame.

In the frame from which master packets have consequently disappeared, all the stations are checked to determine whether or not they have the highest priority for qualification as next master stations (to determine, specifically, whether or not the stations are using blocks of the smallest numbers).

Consequently, the particular station which has the highest priority for qualification as a new master station, namely the station using a block of the smallest number, is turned into a master station and effects transmission of master packets in the next frame.

Figure 9:
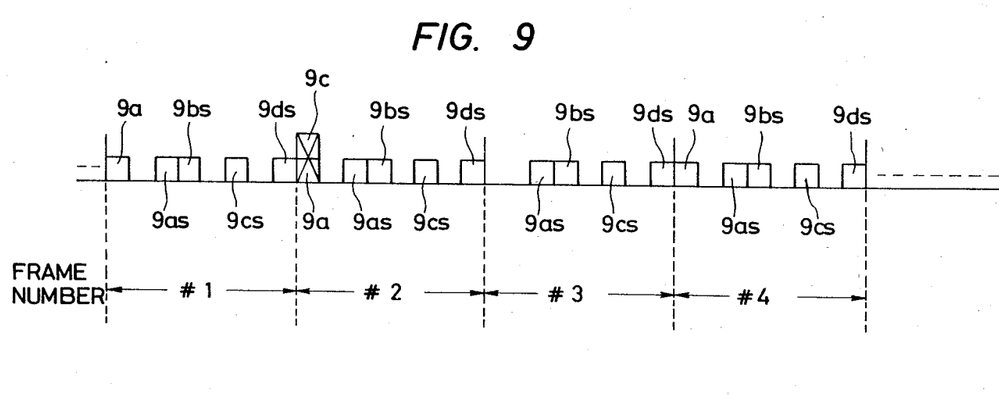

FIG. 9 is a timing diagram illustrating the condition of the aforementioned example. Similar to the case of FIG. 8, Station A serves as a master station and transmits master packets 9b in the #1 block.

In the second frame, because of occurrence of some trouble or other, Station C has transmitted master packets 9c in the #1 block and consequently caused collision of two master packets 9a and 9c.

At this point, all the stations become cognizant of the occurrence of the collision of master packets. Consequently, Station A and Station C which have transmitted master packets in the second frame both discontinue their transmission of master packets in the third frame. Thus, the master packets which have been transmitted in the #1 block before the collision have disappeared.

Here, all the stations which happen to be transmitting data packets are checked to determine whether or not they are using blocks of the smallest block numbers.

In the present case, since Station A is using the block of the smallest block number. Station A turns itself into a master station again in the fourth frame and starts transmitting master packets in the #1 block. Thus, system timing is established again.

EXAMPLE 3

When collision of master packets takes place, the stations which have transmitted the master packets relating to the collision discontinue their transmission of master packets in the next frame.

In the frame from which master packets have consequently disappeared, all the stations other than those which have transmitted master packets before the collision are checked to determine whether or not they have the highest priority for qualification as next master stations. In the case of the embodiment illustrated in FIG. 9, all the stations except for Station A and Station B undergo the aforementioned check.

Then, the station having the highest priority for qualification as a next master station is turned into a master station and starts transmitting master packets in the next frame. In the case of the embodiment of FIG. 9, for instance, Station C is turned into a master station and starts transmitting master packets 9c of Station C in the same #1 block in the place of the master packets 9a as illustrated.

In the preceding embodiments, in the determination of the highest priority for qualification as a new master station, the "use of a block of the smallest block number" has been adopted at the criterion of judgment. Of course, this criterion does not constitute an exclusive requirement.

Conversely, the "use of a block of the largest possible number" may be adopted as the criterion for the judgment under discussion. Otherwise, the priority may be fixed by setting a flag, for example, depending on a predetermined condition.

As is evident from the foregoing description, the present invention attains the following effect:

Even when collision occurs between master packets which govern the synchronization of timing important to the system as a whole, the synchronization of system timing is protected from disturbance.

What is claimed is:

1. In a digital signal transmission system for effecting time-division multiplexing/circuit switching transmission and reception of signals in the form of packets among a multiplicity of personal stations by causing digital signals transferred on a transmission cable to be fixedly positioned within periodically repeating frames along a time axis and further dividing each of the frames on said time axis into unit blocks thereby providing said personal stations with chances for digital signal transmission, a method for the correction of troubles in said digital signal transmission system which comprises detecting occurrence of a collision between master packets transmitted from two or more stations seeking to take leadership in system timing and, in response to said detection of said collision, discontinuing further transmission of master packets from all the stations which have transmitted said master packets relating to said collision, and causing a station, (exclusive of said stations which have transmitted the master packets relating to said collision) with the highest priority for qualification to function as a new master station to transmit master packets for the purpose of taking over the function of master station, thereby establishing system timing.

2. A method according to claim 1, wherein the master packets of the new master station which has taken over the function of master station are transmitted in the same block in which the master packets were transmitted before said collision.

3. In a digital signal transmission system for effecting time-division multiplexing/circuit switching transmission and reception of signals in the form of packets among a multiplicity of personal stations by causing digital signals transferred on a transmission cable to be fixedly positioned within periodically repeating frames along a time axis and further dividing each of the frames on said time axis into unit blocks thereby providing said personal stations with chances for digital signal transmission, a method for the correction of troubles in said digital signal transmission system which comprises detecting occurrence of a collision between master packets transmitted from two or more stations seeking to take leadership in system timing and, in response to said detection of said collision, discontinuing further transmission of master packets from all the stations which have transmitted said master packets relating to said collision, and causing a station (exclusive of the station assuming the status of master station before said collision) with the highest priority for qualification to function as a new master station to transmit master packets for the purpose of taking over the function of master station thereby establishing system timing.

4. A method according to claim 3, wherein the master packets of the new master station which has taken over the function of master station are transmitted in the same block in which the master packets were transmitted before said collision.

5. In a digital signal transmission system for effecting time-division multiplexing/circuit switching transmission and reception of signals in the form of packets among a multiplicity of personal stations by causing digital signals transferred on a transmission cable to be fixedly positioned within periodically repeating frames along a time axis and further dividing each of the frames on said time axis into unit blocks thereby providing said personal stations with chances for digital signal transmission, a method for the correction of troubles in said digital signal transmission system which comprises detecting occurrence of a collision between master packets transmitted from two or more stations seeking to take leadership in system timing and, in response to said detection of said collision, discontinuing further transmission of master packets from all the stations which have transmitted said master packets relating to said collision, and causing a station, (inclusive of said stations which have transmitted said master packets relating to said collision) with the highest priority for qualification to function as a new master station to transmit master packets for the purpose of taking over the functions of master station thereby establishing system timing.

6. A method according to claim 5, wherein the master packets of the new master station which has taken over the function of master station are transmitted in the same block in which the master packets were transmitted before said collision.

7. In a digital signal transmission system for effecting time-division multiplexing/circuit switching transmission and reception of signals in the form of packets among a multiplicity of personal stations by causing digital signals transferred on a transmission cable to be fixedly positioned within periodically repeating frames along a time axis and further dividing each of the frames on said time axis into unit blocks thereby providing said personal stations with chances for digital signal transmission, a method for the correction of troubles in said digital signal transmission system which comprises detecting occurrence of a collision between master packets transmitted from two or more stations seeking to take leadership in system timing and, in response to said detection of said collision, discontinuing further transmission of master packets from all the stations which have transmitted said master packets relating to said collision, and checking remaining stations (which did not generate packets involved in the collision), to identify the station having highest priority for qualification as a new master station and causing the station so identified to take over the function of master station, thereby establishing system timing.

* * * * *